United States Patent
Fang et al.

(10) Patent No.: US 10,248,680 B2
(45) Date of Patent: Apr. 2, 2019

(54) INDEX MANAGEMENT

(71) Applicant: International Business Machines Corporation, Armonk, NY (US)

(72) Inventors: Min Fang, Beijing (CN); Di Jin, Beijing (CN); Zhenyu Shi, Beijing (CN); Nigel G. Slinger, Los Gatos, CA (US); Bart J. L. Steegmans, Alken (BE); Shu Wang, Beijing (CN); Li Fei Zheng, Beijing (CN); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 14/867,496

(22) Filed: Sep. 28, 2015

(65) Prior Publication Data
US 2017/0091245 A1  Mar. 30, 2017

(51) Int. Cl.
*G06F 17/30* (2006.01)

(52) U.S. Cl.
CPC .. *G06F 17/30336* (2013.01); *G06F 17/30345* (2013.01)

(58) Field of Classification Search
None
See application file for complete search history.

(56) References Cited

U.S. PATENT DOCUMENTS

| | | | |
|---|---|---|---|
| 7,774,318 B2 * | 8/2010 | Effern | G06F 17/30492 707/662 |
| 7,987,164 B2 * | 7/2011 | Hu | G06F 17/30336 707/696 |
| 8,626,717 B2 | 1/2014 | Bendakovsky et al. | |
| 8,788,505 B2 * | 7/2014 | Bentkofsky | G06F 17/30327 707/743 |
| 9,189,506 B2 | 11/2015 | Gao et al. | |
| 9,298,761 B2 * | 3/2016 | Graefe | G06F 17/30327 |
| 9,361,402 B2 | 6/2016 | French et al. | |
| 9,378,305 B1 * | 6/2016 | Erdmann | G06F 17/30961 |
| 9,424,297 B2 | 8/2016 | Golod et al. | |
| 9,514,027 B2 * | 12/2016 | Shen | G06F 8/77 |
| 9,720,924 B2 * | 8/2017 | Bender | G06F 17/30094 |
| 2012/0016851 A1 | 1/2012 | Hrle et al. | |
| 2012/0016881 A1 | 1/2012 | Hrle et al. | |

(Continued)

FOREIGN PATENT DOCUMENTS

JP  2011018296 A  1/2011

OTHER PUBLICATIONS

Flint et al., "Data Warehousing on Oracle RAC Best Practices," An Oracle White Paper, Oct. 2008, p. 1-27, Oracle Corporation.

*Primary Examiner* — Debbie Le
(74) *Attorney, Agent, or Firm* — Patricia B. Feighan (57) ABSTRACT

Embodiments of the present invention provide computer-implemented methods, computer systems and computer program products. According to one embodiment of the present invention, an index of a database is obtained, where the index includes at least one node associated with index information of at least one old data entry that has been deleted from the database, and the node is marked as invalid. Then, a node included in the index is selected based on a key value in index information of a new data entry in response to the new data entry being inserted into the database. Next, the selected node is updated with the index information of the new data entry.

17 Claims, 8 Drawing Sheets

(56) References Cited

U.S. PATENT DOCUMENTS

2012/0197900 A1* 8/2012 Mandre ............ G06F 17/30327
                                                    707/743
2013/0238628 A1   9/2013 Behnen et al.
2014/0229429 A1   8/2014 Bestgen et al.

* cited by examiner

| ID | NAME | ... |
|---|---|---|
| ... | ... | ... |
| X | BOB | ... |
| N | ALAN | ... |
| ... | ... | ... |

600B

610B

612B — ADDRESS: 0XAA...4000

614B — ADDRESS: 0XAA...5000

FIG. 6B

INDEX MANAGEMENT

BACKGROUND

With the development of data storage technology, significant improvements have been made to the storage capacity of a database system, and thus hundreds of thousands of or even more data entries can be stored in a database. An index is built for the database for improving of the efficiency of data queries in the database, and many approaches for building the index for the database have been proposed so far.

Although the index increases the efficiency of the data queries, additional workloads are required in building the index if data entries are inserted in the database. Further, maintaining the index also costs extra time and computing resources if data entries in the database are modified. Specifically, under some circumstances (for example, if the database is refreshed), all the data entries are deleted and then new data entries are inserted into the database. At this point, the index of the database is deleted together with the data entries in the database during the deleting procedure, and then a new index is built during inserting new data entries into the database. Building a new index is time-consuming and needs extra computing resources.

SUMMARY

In one aspect of the present invention, a computer-implemented method is proposed. According to the method, an index of a database is obtained, where the index includes at least one node associated with index information of at least one old data entry that has been deleted from the database, and the node is marked as invalid. Then, a node included in the index is selected based on a key value in index information of a new data entry in response to the new data entry being inserted into the database. Next, the selected node is updated with the index information of the new data entry.

In another aspect of the present invention, a computer system for index management is proposed. The computer system comprises one or more computer processors; one or more computer readable storage medium; and program instructions stored on the computer readable storage medium for execution by at least one of the one or more processors. The program instructions comprise: program instructions to obtain an index of a database, the index including at least one node associated with index information of at least one old data entry that has been deleted from the database, and the node being marked as invalid; program instructions to select a node included in the index based on a key value in index information of a new data entry in response to the new data entry being inserted into the database; and program instructions to update the selected node with the index information of the new data entry.

In yet another aspect of the present invention, a computer program product is proposed. The computer program product is tangibly stored on a non-transient machine readable medium and comprises executable instructions which, when executed on an electronic device, cause the electronic device to: obtain an index of a database, the index including at least one node associated with index information of at least one old data entry that has been deleted from the database, and the node being marked as invalid; select a node included in the index based on a key value in index information of a new data entry in response to the new data entry being inserted into the database; and update the selected node with the index information of the new data entry.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
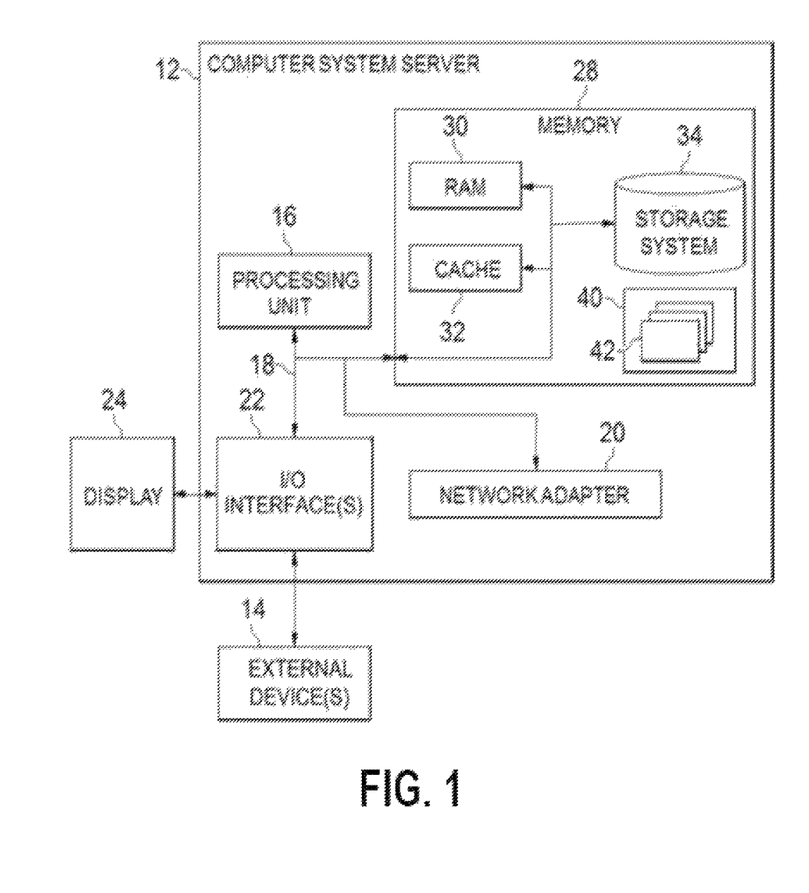
FIG. 1 schematically illustrates an example computer system/server 12 which is applicable to implement embodiments of the present invention.

Reference is first made to FIG. 1, in which an example electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It would be appreciated that the computer system/server 12 illustrated in FIG. 1 is only an example for implementing one embodiment of the present invention. In another embodiment of the present invention, other computing devices may be adopted, for example, if the present invention is implemented in a distributed database environment, the index management may be implemented in a computing node in the distributed database environment.

Figure 2:
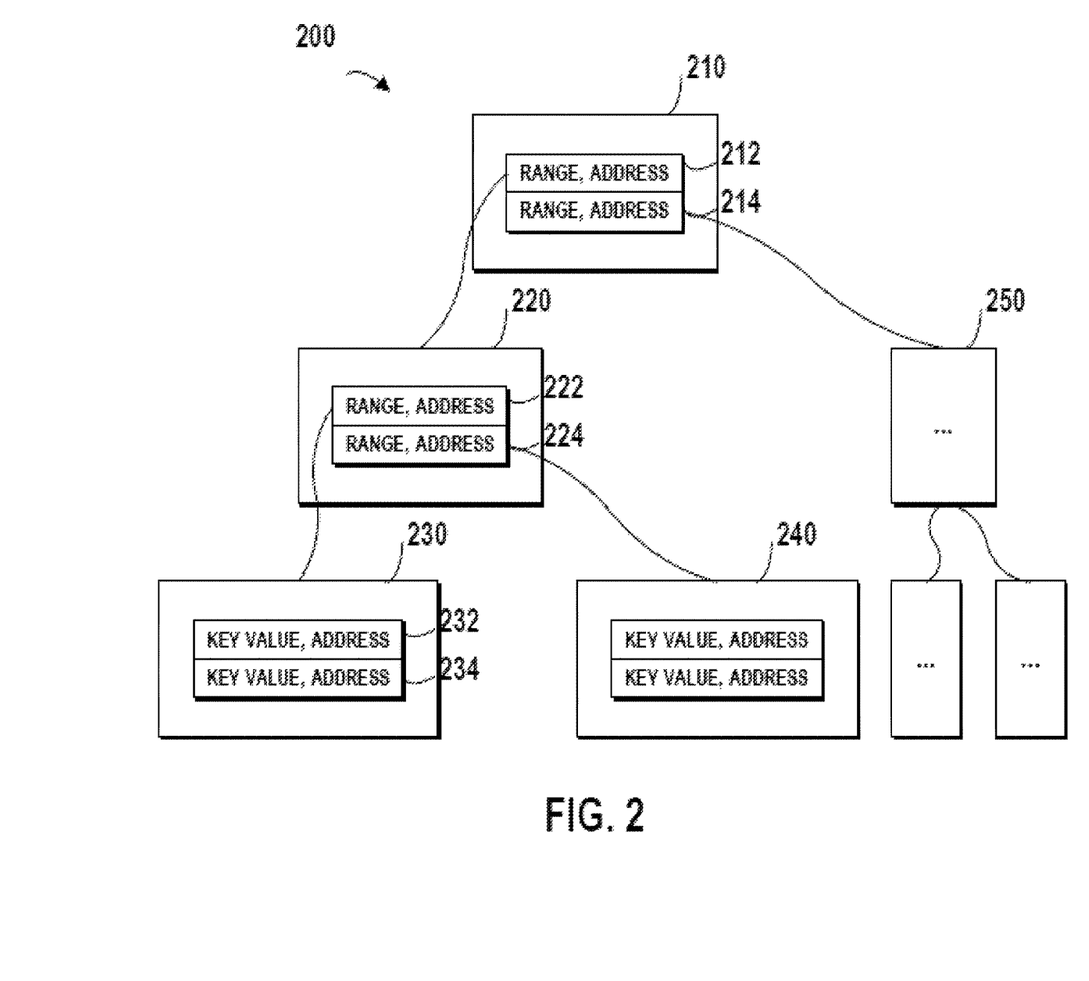
FIG. 2 schematically illustrates an example index that one embodiment of the present invention utilize.

FIG. 2 schematically illustrates an example index 200 that one embodiment of the present invention utilize. The index 200 is a tree with a root of a node 210. Nodes in the index 200 record index information of the data entries in a database, and these nodes are sorted according to the key values of the data entries. For example, regarding a table in the database stores information such as {ID, name, age, . . . } of 40 students in a class, the ID of the student may be considered as the key of the table. If a data entry with an ID of "01" is queried in the database, then the location of the queried data entry is quickly obtained from the index 200.

The index 200 of the database may be built according to various algorithms. Usually, a tree structure is adopted and various types of nodes in the tree indicate various aspects of the index. As illustrated in FIG. 2, non-leaf nodes (including the root node 210 and other intermediate nodes 220 and 250) record ranges of the key values and locations of their children nodes. For example, the node 210 includes index information about two children nodes. The range field in index information 212 indicates the range of the child node 220, and the address field in the information 212 indicates the location of the child node 220 (the address is linked to node 220). Similarly, the range field in index information 214 indicates the range of the child node 250, and the address field in the index information 214 indicates the location of the child node 250. Moreover, Information 222 and 224 in the intermediate node 220 indicate the index information about leaf nodes 230 and 240, respectively.

The leaf node in the index records index information about one or more data entries in the database. For example, the node 230 records index information 232 and 234 about two data entries in the database respectively. The "key value" field in the index information 232 indicates the key value of one data entry and the "address" field indicates the location of the data entry (in this example, the address is linked to the address of the data entry in the table in the database). Similarly, the index information 234 indicates the key value and location of another data entry in the database.

It would be appreciated that although the index 200 as illustrated in FIG. 2 shows one index for one table in the database, multiple indexes may be built for a database including multiple tables. Where there are multiple indexes, embodiments of the present invention may be applied to other indexes in the database. Further, although the index 200 illustrated in FIG. 2 includes only three levels, in another example, the index may include more or less levels according to the numbers of the data entries in the table as well as the maximum amount of index information that may be stored in each leaf nodes.

Sometimes, the database is refreshed. For example, in a database such as a data warehouse, large tables are refreshed by means of deleting all data entries as well as the index (mass delete) and then inserting back new data entries. For another example, in a test environment, old data entries are deleted and the latest production data are loaded into the database. Refreshing such a database may cause performance problems, specifically the index of the database needs to be rebuilt during the insert procedure, thereby the performance of the database greatly degrades.

In order to reduce the cost for building the index after data refreshing, the present invention proposes a method. In the method, an index of a database is obtained, where the index includes at least one node associated with index information of at least one old data entry that has been deleted from the database, and the node is marked as invalid. Then, a node included in the index is selected based on a key value in index information of a new data entry in response to the new data entry being inserted into the database. Next, the selected node is updated with the index information of the new data entry. During data refreshing, the numbers of data entries that have been deleted and that of those to be inserted are similar. Meanwhile, the key distributions of the two types of data entries are almost the same. Accordingly, reusing the old index reduces the workloads in building the new index.

Figure 3:
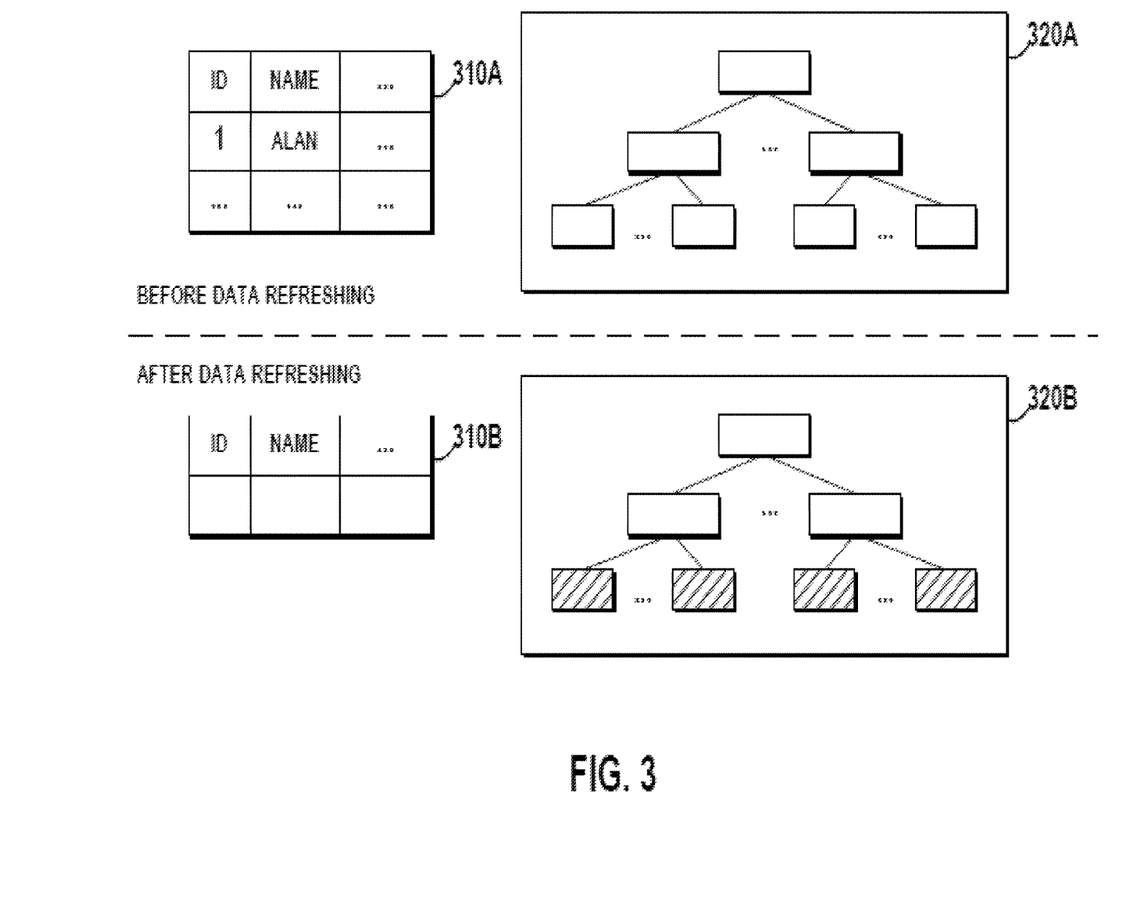
FIG. 3 schematically illustrates a block diagram of a method for managing an index according to one embodiment of the present invention.

FIG. 3 schematically illustrates a block diagram 300 of a method for managing an index according to one embodiment of the present invention. The upper portion of FIG. 3 illustrates a table 310A and an index 320A before the data refreshing, and the lower portion of FIG. 3 illustrates a table 310B and an index 320B after the data refreshing. Before the data refreshing, the table 310A includes a plurality of data entries of the students, and the index 320A indicates an index of the table 310A. The index 320B is built based on the data entries included in the table 310A. After the data refreshing, all the data entries have been deleted (as illustrated in the table 310B), and the tree structure and nodes in the index 320B are kept for reuse instead of being deleted. According to FIG. 3, the leaf nodes (as illustrated in the shaded boxes) in the index 320B are identified as invalid nodes for further use instead of being deleted from the index 320B.

It would be appreciated that building the index for the database is time consuming and involves great computing workloads, especially when a huge number of data entries are stored in the database, the cost for building a new index results in heavy burdens to the database system. In order to reduce the cost for building the index after data refreshing, embodiments of the present invention propose methods for reusing the index including index information of the old data entries that have been deleted from the database. Specifically, the data in the index 320B (for example, the hierarchical structure of the index 320B and the index information in the nodes of the index 320B) are kept for further reuse.

As the time cost for building an index greatly depends on the workloads for creating and inserting a new node into the index, reusing the hierarchical structure of the index 320A including complete index information about the old data entries may reduce the time cost for the above creating and inserting procedure, thereby the total cost for building the new index when the table 310B is inserted with new data entries may be reduced. When new data entries are inserted into the table 310B, the content of the table 310B changes and the index 320B is updated during the inserting procedure.

Figure 4:
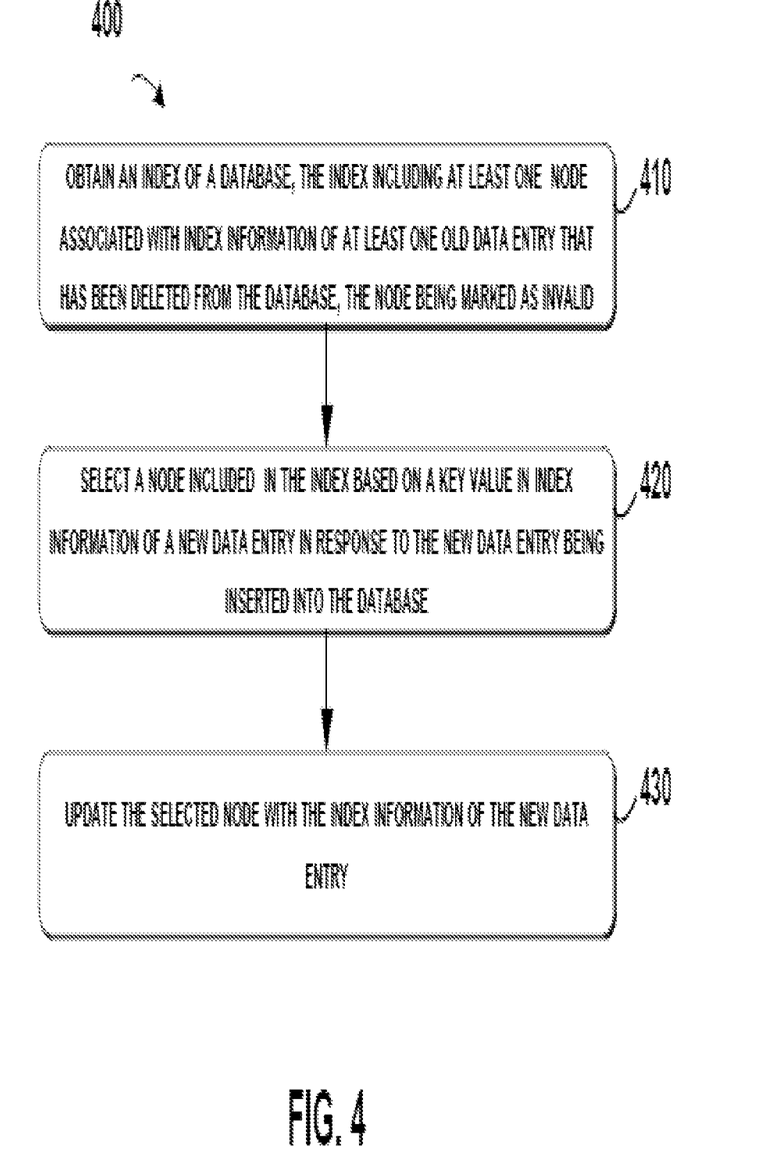
FIG. 4 schematically illustrates a flowchart of a method for managing an index according to one embodiment of the present invention.

Details of the index management will be described with reference to FIG. 4, which schematically illustrates a flowchart 400 of a method for managing an index according to one embodiment of the present invention. In Step 410, an index of a database is obtained, where the index includes at least one node associated with index information of at least one old data entry that has been deleted from the database, and the node is marked as invalid. In this embodiment, when the old data entries are deleted from the database during the data refreshing, the index including index information of these old data entries is saved as the base for building the new index. The leaf nodes in the index are marked with predefined flags as invalid showing that they are associated with index information of the old data entries that have been deleted from the database.

In this embodiment, the number of nodes associated with index information of at least one old data entry that has been deleted from the database depends on the detailed structure of the index. For example, if it is specified that one node may contain index information of only one data entry, then one node may be associated with only one old data entry. Further, if it is specified that one node may contain index information of a plurality of data entries, then one node may be associated with a plurality of old data entries.

In Step 420, a node included in the index is selected based on a key value in index information of a new data entry in response to the new data entry being inserted into the database. When a new data entry is inserted into the database, the index information of the new data entry is added into a certain node in the index. The index may be built according to various algorithms. Although embodiments of the present invention are described by taking a B+ tree as an example index, the index may be designed based on other algorithms and comprise but not be limited to a binary tree, a B+ tree or other types of trees derived from the binary tree, as long as these data structures are suitable for storing index information of the database.

In Step 430, the selected node is updated with the index information of the new data entry. At this point, the nodes in the index are sequentially ordered and the index information of the new data entry is updated into a proper node in the index such that the updated index is still in order, then the updated index includes the index information of new data entry being inserted into the database. Although the embodiment of the present invention is described in a data refreshing environment, another embodiment may be applied to a database from which portions of the old data entries are deleted.

Figure 5A:
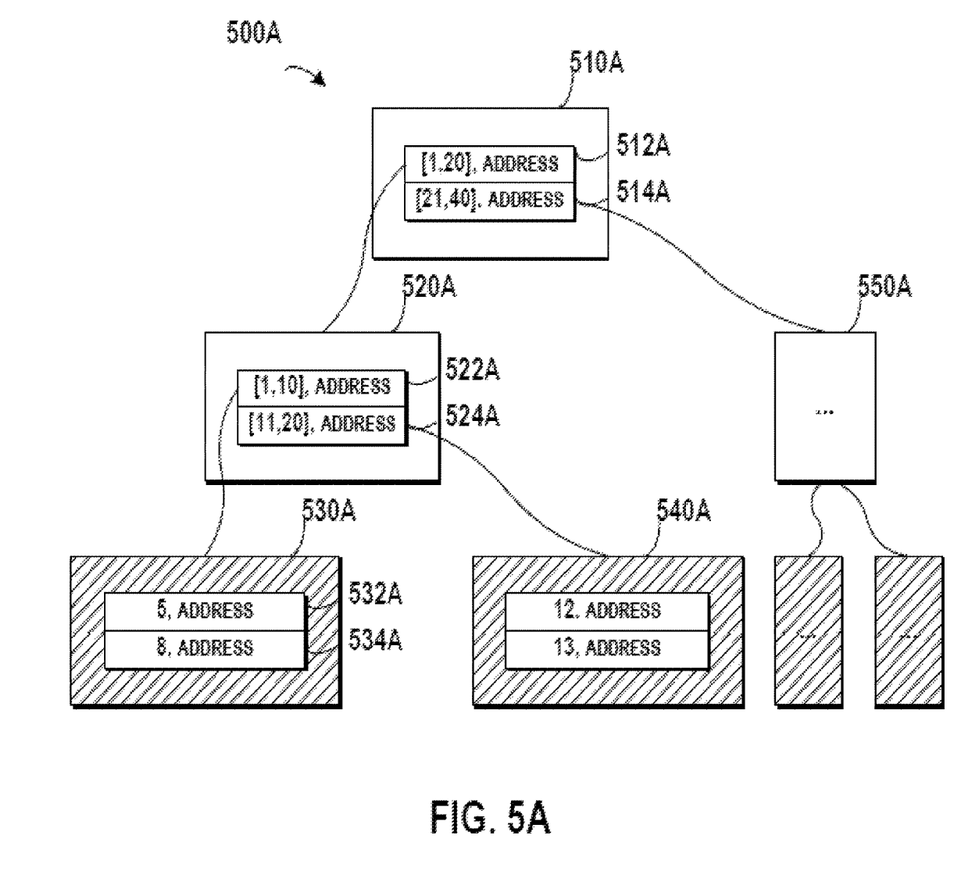
FIG. 5A schematically illustrates a block diagram of an index that may be reused according to one embodiment of the present invention, and FIG. 5B schematically illustrates a block diagram for managing the index illustrated in FIG. 5A according to one embodiment of the present invention.

Details of the Step 410 in FIG. 4 will be described with reference to FIGS. 5A and 5B. FIG. 5A schematically illustrates a block diagram of an index 500A that may be reused according to one embodiment of the present invention. The index 500A is built for the above table including data entries of the 40 students. In the index 500A, the root node 510A is linked to nodes 520A and 550A by index information 512A and 514A respectively. The range fields in the index information 512A and 514A indicate the ranges of child nodes respectively. For example, "[1, 20]" in the index information 512A indicates the range of the key value in the child node 520A is from 1 to 20. Similarly, the index information 522A and 524A in the node 520A indicates the ranges of nodes 530A and 540A, respectively.

After the database is refreshed in a data refreshing procedure, all the data entries are deleted from the database. Compared with a conventional approach, the index 500A is not deleted together with the data entries but is saved as an initial data structure for building the new index. When the new data entries are inserted into the empty database, the index 500A is updated with the index information of the new data entries. A predefined flag may be used for indicating the invalid state of the leaf node. For example, the invalid state indicates the index information in this node is associated with the old data entry that has been deleted from the database. In other words, the invalid node in the index records old index information instead of the latest index information.

After the data refreshing, all the old data entries are deleted from the database, and the leaf nodes storing the index information of the old data entries are not associated with the latest data reflecting the current state of the database. As illustrated in the shaded boxes in FIG. 5A, these leaf nodes are marked with a predefined flag indicating that the data in these leaf nodes are index information of the old data entries have been deleted from the database. In this example, the index 500A illustrated in FIG. 5A may be taken as the base for building the new index.

In one embodiment of the present invention, the plurality of nodes in the index may be traversed based on the key value in the index information of the new data entry. Then, the node may be selected in response to a range of a parent of the node matching the key value in the index information of the new data entry. As the nodes in the index are sequentially ordered, the index information of the new data entry being inserted into the database should be added into a proper node in the index so as to assure that the nodes in updated index are stilled in order. Accordingly, an appropriate node may be selected from the nodes sequentially ordered in the index including index information of the old data entries that have been deleted from the database.

In embodiments of the present invention, the selected node may satisfy any of the following criteria: (1) the range of the parent node covers the key value of the new data entry being inserted, in other words, the key value of the new data entry being inserted falls within the range of the parent node; and (2) the distance from the key value of the new date entry being inserted to the range of the parent node is shorter than the distant from the key value of the new data entry to the range of another non-leaf node. At this point, the index information of the new data entry is updated into a node whose parent node covers the key value of the new data entry, or a node whose parent node is closest to the key value of the new data entry.

As the nodes in the index are sequentially ordered, the node selected according to the above criteria assures that the index information of the new data entry is updated into an appropriate node in the index. Therefore, the nodes in the updated index are still sequentially ordered.

In one embodiment of the present invention, the node may be selected in response to the node being invalid, and then the node may be marked as valid. In another embodiment of the present invention, the node may be selected in response to the node being valid and not full. How to select the appropriate node and update the selected node with the index information of the new data entry will be described hereinafter.

Figure 5B:
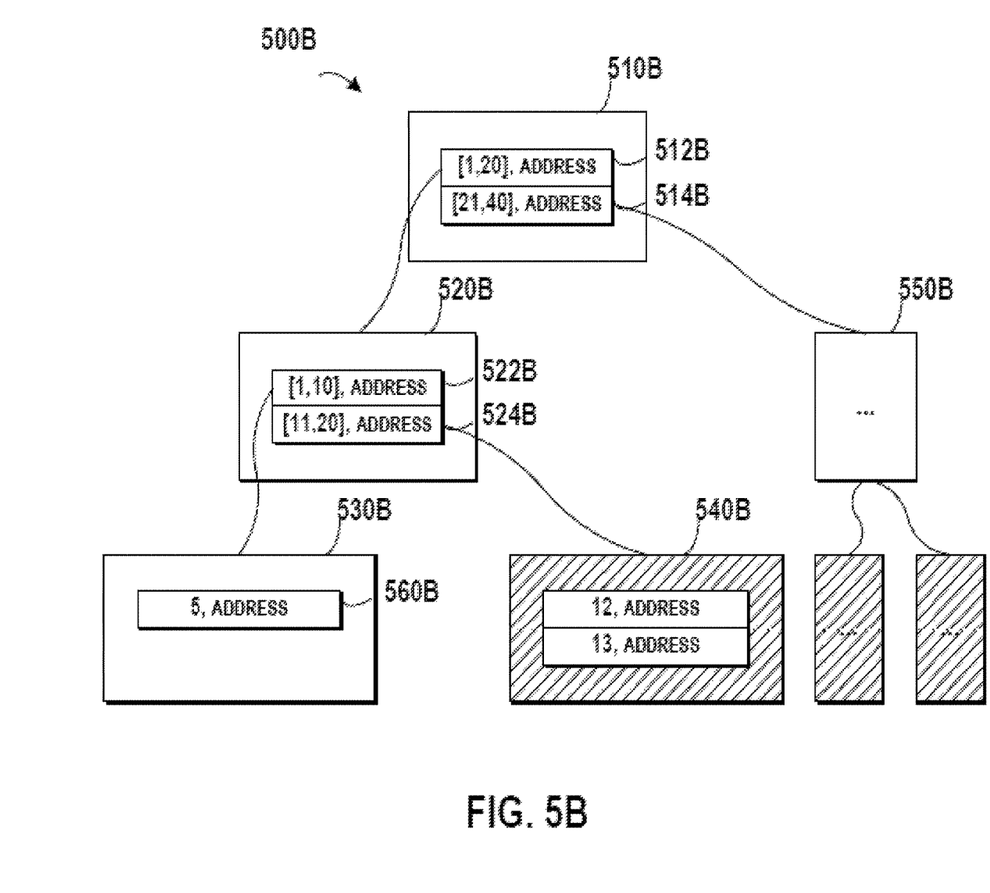

Reference is made to FIG. 5B, which schematically illustrates a block diagram for updating the index 500A illustrated in FIG. 5A according to one embodiment of the present invention. The index 500B in FIG. 5B is similar as the index 500A in FIG. 5A, where similar reference numbers represent similar elements and details are omitted herein.

One new data entry such as {ID=5, NAME= ALAN, . . . } is inserted into the database. The index information may be generated from the new data entry being inserted into the database. With respect to the new data entry, the key value in the index information may be the ID of the student, for example, the key value is "5" in this example. Then the index 500B may be traversed to find a node whose parent node covers the key value of "5." The traversing begins at the root node 510B, the key value "5" of the new data entry is compared with the index information 512B and 514B in the root node 510B, respectively. As the range "[1, 20]" in the index information 512B covers the key value "5," the traversing proceeds to the node 520B. Then, the key value "5" of the new data entry is further compared with the index information 522B and 524B in the node 520B, respectively. Finally, the node 530B is selected because the range "[1, 10]" of the node 530B covers the key value "5," accordingly, the node 530B may be selected and then the index information 560B of the new data entry may be updated into the node 530B. At this point, the old index information of the old data entry that has been deleted may be replaced by the index information of the new data entry being inserted, and then the node 530B may be identified as a valid node.

In one embodiment of the present invention, the node may be selected in response to the node being a valid node and not being full. Another new data entry {ID=6, NAME=BOB, . . . } may be inserted in the database, and the procedure for updating the index 500B is similar as that described during inserting the data entry {ID=5, NAME=ALAN, . . . }. By comparing the key value of "6" with the ranges in the nodes 510B and 520B, the node 530B is selected as the appropriate node.

In one embodiment of the present invention, a key value of the node may be updated with the key value in the index information of the new data entry. For example, the index information 560B of the new data entry {ID=5, NAME=ALAN, . . . } may be inserted into the selected node 530B. Each leaf node in the index may include a certain amount of index information. Further, the index information of the new data entry {ID=6, NAME=BOB, . . . } may be added into the node 530B, for example, attached to the end of the index information 560B.

In one embodiment of the present invention, a key value of the node may be updated with the key value in the index information of the new data entry, and then the range of the parent of the node may be updated based on the key value of the new data entry in response to the key value in the index information of the new data entry mismatching the range of the parent.

In this embodiment, if the range of the parent of the selected node covers the key value of the new data entry, the range of the parent node will not be updated. Otherwise, if the range of the parent of the selected node does not cover the key value of the new data entry, then the range of the parent may be updated. For example, if the key value of the new data entry being inserted in the database is "0," then the index information of the new data entry may first be added into the selected node 530B, then the range in the index information 522B of the parent node 520B may be updated to "[0, 10]."

In one embodiment of the present invention, the node may be split into a first node and a second node in response to the node being valid and full. For example, if the leaf node holds a maximum of two pieces of index information, then the leaf node should be split when the selected node already includes two pieces of information. At this point, the splitting step may follow rules for splitting a node in the art and details are omitted hereinafter.

In one embodiment of the present invention, the node includes an address indicating the location where one of the at least one old data entry had been stored in the database, and the address in the node may be updated with a location of the new data entry in the database. As illustrated in FIG. 5B, the index information 560B in the node 530B includes the "key value" field and the address field. At this point, as the address indicates the location where the old data entry has been stored in the database, this address field should be updated with the address of the new data entry being inserted into the database.

Figure 6A:
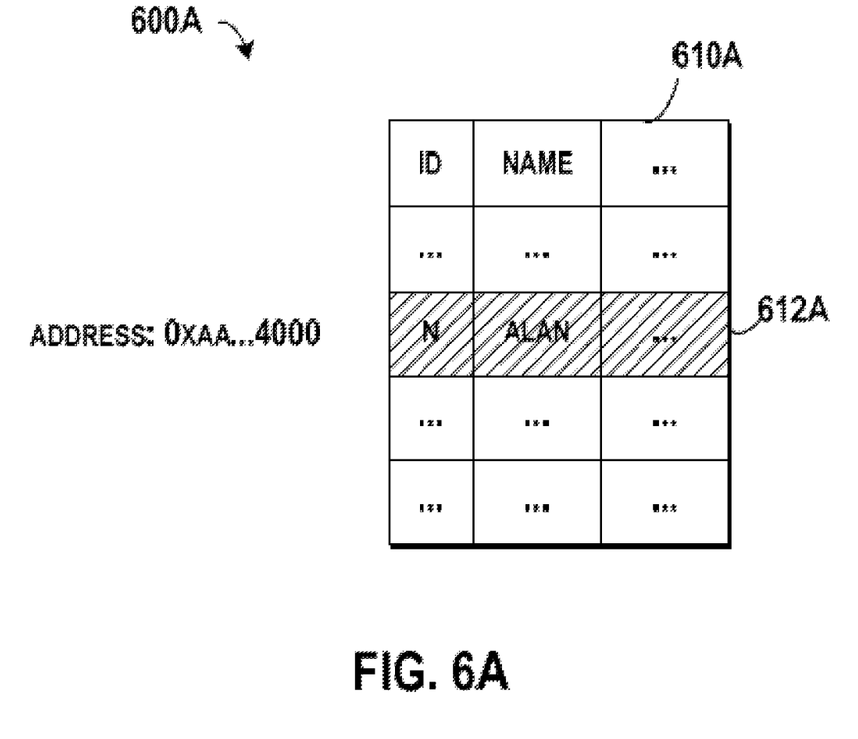
FIG. 6A schematically illustrates a block diagram of inserting a new data entry into a table in the database according to one embodiment of the present invention.

Reference is made to FIG. 6A, which schematically illustrates a block diagram 600A of inserting a new data entry into a table according to one embodiment of the present invention. A reference number 610A indicates a table in the database in which a new data entry 612A is inserted. In this example, the new data entry 612A is inserted at an address "0xAA . . . 4000" in the table 610A, and then the address "0xAA . . . 4000" is updated into the index information in the selected node to replace the old address of the old data entry.

In one embodiment of the present invention, a candidate location of the new data entry in the database may be determined based on an address of the node, and then the address may be updated with the candidate location. When a data entry is queried, the queried data entry may be quickly retrieved from the database based on the key value and the address of the data entry recorded in the index. In order to further increase the performance of the data query, the data entries may be clustered in the database according to the key values of the data entries.

In this embodiment, the data entries with similar key values (key values within a certain range) may be stored at a similar range of the addresses. For example, the data entries with the IDs from 1 to 10 may be stored in a range of addresses [0xAA . . . 4000, 0xAB . . . 4000), and the data entries with the IDs from 11 to 20 may be stored in a range of addresses [0xAB . . . 4000, 0xAC . . . 4000). At this point, the index is a clustered index and the data entries in the database are clustered into a certain order matching the index. Since the data entries are sorted in order on the disk, the clustered index greatly increases overall speed of the data query. If the data entries in the database are organized in the above manner and the index is a clustered index, then the index information in the leaf nodes of the index may be used in determining the location for inserting the new data entry into the database.

Figure 6B:
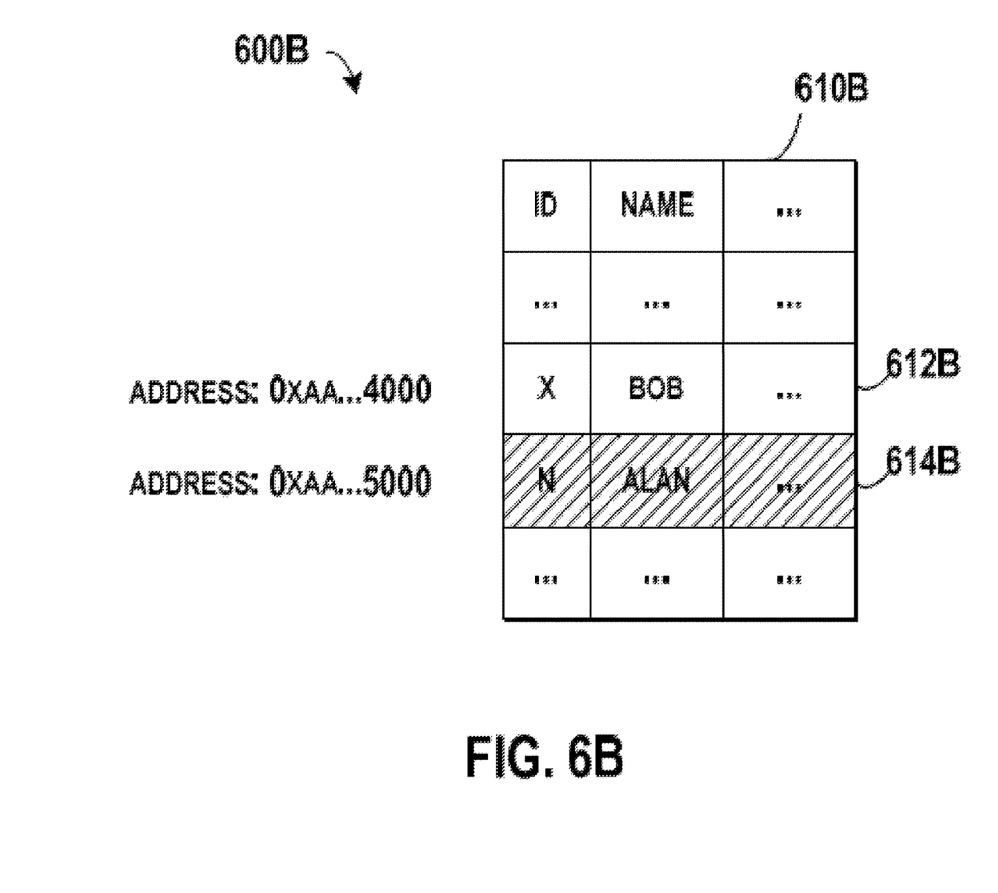
FIG. 6B schematically illustrates a block diagram of inserting a new data entry into a table in the database according to another embodiment of the present invention.

Reference is made to FIG. 6B, which schematically illustrates a block diagram 600B of inserting a new data entry into a table in the database according to another embodiment of the present invention. A reference number 610B indicates a table in which the data entries are clustered according to the key value "ID." A data entry 612B is stored at the address of "0xAA . . . 4000," and a new data entry {ID=N, NAME=ALAN, . . . } will be inserted into the table 610B. At this point, a node may be selected from the index according to the method illustrated in FIG. 4, then the old index information in the selected node may be used to determine the physical address for inserting the new data entry.

The index information of the selected node may suggest a candidate location for inserting the new data entry. For example, if the index information indicates that the old data entry was stored at an address of "0xAA . . . 4000," then "0xAA . . . 4000" may be a candidate location. Next, whether a data entry is stored at the candidate location may be checked. If the candidate location is empty then the new data entry may be inserted at the candidate location. Otherwise if a data entry (for example, the data entry 612B as illustrated in FIG. 6B) is already located at the candidate location, then an empty address near the candidate location may be determined for storing the new data entry. As illustrated in FIG. 6B, another address "0xAA . . . 5000" which is next to the candidate location may be selected for storing the new data entry. At this point, the new data entry is inserted at the address near the candidate location, thereby the index updated with the index information of the new data entry is still a clustered index.

In one embodiment of the present invention, the index may be updated with index information of a data entry in response to the data entry in the database being modified. The data entry may possibly be updated after it being inserted into the database. The updating of the data entry may relate to multiple aspects. For example, if one or more columns of the data entry other than the key are changed, then this type of updating does not result in an update in the index. For another example, the key value of the updated data entry may change, the location of the data entry in the data base may change, further both of the key value and the location of the data entry may change. If the key value of the data entry is modified, then the index information of the data entry is changed and then the associated node in the index should be updated with the index information of the updated data entry.

In one aspect, if the key value of the updated data entry is still covered by the parent node of the associated node in the index, then only the "key value" field in the corresponding node may be updated with the key value of the updated data entry. Otherwise, if the key value of the updated data entry is not covered by the parent node, then index information in the associated node in the index may be identified as invalid and another node may be selected from the index according to the method for selecting a node from the index described with reference to FIG. 4. In another aspect, if the content of the data entry is not modified while the location of the data entry moves to a new address in the database, then the address field in the node associated with the updated data entry should be replaced with the new address. In still another aspect, if both of the key value and the location of the updated data entry changes, then the index information in the associated node in the index may be identified as invalid and another node may be selected from the index according to the above method of the embodiments of the present invention.

In one embodiment of the present invention, a node in the index may be marked as invalid in response to data entries associated with the node having been deleted from the database. Once the data entry is deleted from the data entry, the index information corresponding to the data entry in the node of the index is useless and thus may be identified as invalid.

According to embodiments of the present invention, the index including index information of old data entries that have been deleted from the database is reused after the data refreshing. As this index includes sufficient index information about the old data entries, the index may be reused in building the index during new data entries being inserted into the database. Further, as the non-leaf nodes already record the range information, the cost for creating new non-leaf nodes and defining the range of the non-leaf nodes may be reduced. Moreover, as there are plenty of leaf nodes including index information of the deleted data entries, these leaf nodes may be reused and cost for creating new leaf nodes may be significantly reduced.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. Since the apparatus/system is based on the same invention concept as the method, the same or corresponding implementation details are also applicable to means or modules corresponding to the method. As detailed and complete description has been presented above, the apparatus/system is not detailed below.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. For example, one or more units in the system may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing an index associated with an online database, comprising:
   in response to a data refresh associated with the online database where each old data entry within a plurality of old data entries is deleted, saving the index including a plurality of index information associated with the deleted plurality of old data entries as the base for building a new index, wherein a plurality of nodes in the saved index are marked with a plurality of predefined flags as invalid indicating the plurality of nodes are associated with a plurality of index information of the old data entries that have been deleted from the database;
   obtaining the saved index of the database;
   selecting a node included in the saved index based on a key value in index information of a new data entry in response to the new data entry being inserted into the database, wherein the selecting the node included in the saved index comprises:
      traversing the plurality of nodes based on the key value in the index information of the new data entry; and
      selecting the node in response to a range of a parent of the node matching the key value in the index information of the new data entry; and
   updating the selected node with the index information of the new data entry to build the new index, wherein a number of data entries associated with the deleted plurality of old data entries is similar to a number of new data entries inserted to build the new index.

2. The method of claim 1, wherein selecting the node in response to the range of the parent of the node matching the key value in the index information of the new data entry comprises:
   in response to the node being invalid, selecting the node and marking the node as valid; or
   in response to the node being valid and not full, selecting the node.

3. The method of claim 2, further comprising:
   in response to the node being valid and full, splitting the node.

4. The method of claim 1, wherein updating the selected node with the index information of the new data entry comprises updating a key value of the node with the key value in the index information of the new data entry,
   the method further comprising:
      updating the range of the parent of the node based on the key value of the new data entry in response to the key value in the index information of the new data entry mismatching the range of the parent of the node.

5. The method of claim 4, wherein the node includes an address indicating the location where one of the at least one old data entry had been stored in the database, and wherein updating the selected node with the index information of the new data entry further comprises:
   updating the address in the node with the location of the new data entry in the database.

6. The method of claim 5, wherein updating the address in the node comprises:
   determining a candidate location of the new data entry in the database based on an address of the node; and
   updating the address with the candidate location.

7. The method of claim 1, further comprising:
   updating the index with index information of a data entry in response to the data entry in the database being modified.

8. The method of claim 1, further comprising:
   marking a node in the index as invalid in response to data entries associated with the node having been deleted from the database.

9. A computer system for managing an index associated with an online database, comprising:
   one or more computer processors;
   one or more computer readable storage medium;
   program instructions stored on the computer readable storage medium for execution by at least one of the one or more processors comprising:
      in response to a data refresh associated with the online database where each old data entry within a plurality of old data entries is deleted, program instructions to save the index including a plurality of index information associated with the deleted plurality of old data entries as the base for building a new index, wherein a plurality of nodes in the saved index are marked with a plurality of predefined flags as invalid indicating the plurality of nodes are associated with a plurality of index information of the old data entries that have been deleted from the database;
      program instructions to obtain the saved index of the database;
      program instructions to select a node included in the saved index based on a key value in index information of a new data entry in response to the new data entry being inserted into the database, wherein the selecting the node included in the saved index comprises:

program instructions to traverse the plurality of nodes based on the key value in the index information of the new data entry; and program instructions to select the node in response to a range of a parent of the node matching the key value in the index information of the new data entry; and program instructions to update the selected node with the index information of the new data entry to build the new index, wherein a number of data entries associated with the deleted plurality of old data entries is similar to a number of new data entries inserted to build the new index.

10. The system of claim 9, wherein the program instructions further comprise:

program instructions to select the node and marking the node as valid in response to the node being invalid; and program instructions to select the node in response to the node being valid and not full.

11. The system of claim 10, wherein the program instructions further comprise:

program instructions to split the node in response to the node being valid and full.

12. The system of claim 9, wherein the program instructions further comprise:

program instructions to update a key value of the node with the key value in the index information of the new data entry; and program instructions to update the range of the parent of the node based on the key value of new the data entry in response to the key value in the index information of the new data entry mismatching the range of the parent of the node.

13. The system of claim 12, wherein the node includes an address indicating the location where one of the at least one old data entry had been stored in the database, and wherein the program instructions further comprise:

program instructions to update the address in the node with a location of the new data entry in the database.

14. The system of claim 13, wherein the program instructions further comprise:

program instructions to determine a candidate location of the new data entry in the database based on an address of the node; and program instructions to update the address with the candidate location.

15. A computer program product for managing an index associated with an online database, the computer program product comprising:

one or more computer-readable storage devices and program instructions stored on at least one of the one or more tangible storage devices, the program instructions executable by a processor, the program instructions comprising:

in response to a data refresh associated with the online database where each old data entry within a plurality of old data entries is deleted, program instructions to save the index including a plurality of index information associated with the deleted plurality of old data entries as the base for building a new index, wherein a plurality of nodes in the saved index are marked with a plurality of predefined flags as invalid indicating the plurality of nodes are associated with a plurality of index information of the old data entries that have been deleted from the database;

program instructions to obtain the saved index of the database;

program instructions to select a node included in the saved index based on a key value in index information of a new data entry in response to the new data entry being inserted into the database, wherein the selecting the node included in the saved index comprises:

program instructions to traverse the plurality of nodes based on the key value in the index information of the new data entry; and program instructions to select the node in response to a range of a parent of the node matching the key value in the index information of the new data entry; and program instructions to update the selected node with the index information of the new data entry to build the new index, wherein a number of data entries associated with the deleted plurality of old data entries is similar to a number of new data entries inserted to build the new index.

16. The computer program product of claim 15, wherein the instructions further cause the electronic device to:

in response to the node being invalid, select the node and marking the node as valid; or in response to the node being valid and not full, select the node.

17. The computer program product of claim 15, wherein the instructions further causing the electronic device to:

update a key value of the node with the key value in the index information of the new data entry; and update the range of the parent of the node based on the key value of the new data entry in response to the key value in the index information of the new data entry mismatching the range of the parent.

* * * * *